United States Patent
Zhou et al.

(10) Patent No.: US 12,526,663 B2
(45) Date of Patent: Jan. 13, 2026

(54) INTERFERENCE MEASUREMENT STATION, ACCESS POINT, AND METHOD

(71) Applicant: HUAWEI TECHNOLOGIES CO., LTD., Guangdong (CN)

(72) Inventors: Yifan Zhou, Shenzhen (CN); Yuchen Guo, Shenzhen (CN); Jian Yu, Shenzhen (CN); Yunbo Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 592 days.

(21) Appl. No.: 17/853,056

(22) Filed: Jun. 29, 2022

(65) Prior Publication Data
US 2022/0330065 A1    Oct. 13, 2022

Related U.S. Application Data

(63) Continuation of application No. PCT/CN2020/141573, filed on Dec. 30, 2020.

(30) Foreign Application Priority Data

Dec. 30, 2019  (CN) .......................... 201911398248.7

(51) Int. Cl.
*H04W 16/28*  (2009.01)
*H04B 17/345*  (2015.01)
*H04W 24/08*  (2009.01)

(52) U.S. Cl.
CPC .......... *H04W 24/08* (2013.01); *H04B 17/345* (2015.01)

(58) Field of Classification Search
CPC ..... H04B 17/24; H04B 17/345; H04W 24/08; H04W 84/12
See application file for complete search history.

(56) References Cited

U.S. PATENT DOCUMENTS 12,004,088 B2 * 6/2024 Ying .................... H04W 52/367
2016/0095092 A1 * 3/2016 Khoryaev ............. G01S 5/0289
370/329

(Continued)

FOREIGN PATENT DOCUMENTS

CN     104995946 A    10/2015
CN     106416412 A    2/2017

(Continued)

OTHER PUBLICATIONS 802.3br-2016—IEEE Standard for Ethernet Amendment 5: Specification and Management Parameters for Interspersing Express Traffic Oct. 14, 2016 total:58pages.

(Continued)

*Primary Examiner* — Phuc H Tran
(74) *Attorney, Agent, or Firm* — WOMBLE BOND DICKINSON (US) LLP

(57) ABSTRACT

Embodiments of this application disclose an interference measurement station, access point, and method, where the method includes: A second station receives, on a second link, a measurement signal sent by a first station on a first link. The second station generates a measurement result based on the received measurement signal. The second station sends the measurement result to an access point. The embodiments of this application can be used to facilitate scheduling of communication between different stations by the access point, to reduce a collision probability between stations that interfere with each other, and to improve an overall system throughput.

14 Claims, 9 Drawing Sheets

(56) References Cited

U.S. PATENT DOCUMENTS

| | | | |
|---|---|---|---|
| 2019/0007114 A1 | 1/2019 | Jaganathan et al. | |
| 2019/0239112 A1* | 8/2019 | Rao | H04L 1/08 |
| 2020/0022089 A1* | 1/2020 | Guo | H04W 52/26 |
| 2020/0059915 A1* | 2/2020 | Lee | H04W 72/20 |
| 2020/0344614 A1* | 10/2020 | Takano | H04B 17/345 |
| 2020/0351690 A1* | 11/2020 | Zhu | H04W 76/28 |
| 2021/0266133 A1* | 8/2021 | Zhang | H04L 1/1861 |

FOREIGN PATENT DOCUMENTS

| | | | | |
|---|---|---|---|---|
| CN | 109150338 A | 1/2019 | | |
| CN | 110049510 A | 7/2019 | | |
| WO | WO-2018128297 A1 * | 7/2018 | | H04B 17/345 |

OTHER PUBLICATIONS

IEEE Standard for Information technology—Telecommunications and information exchange between systems Local and metropolitan area networks—Specific requirements—Part 11: Wireless LAN Medium Access Control (MAC) and Physical Layer (PHY) Specifications, IEEE 802.Nov. 2016, 3534 pages.

802.1Qbu-2016—IEEE Standard for Local and metropolitan area networks—Bridges and Bridged Networks—Amendment 26: Frame Preemption,Aug. 30, 2016,total:52pages.

* cited by examiner

| First station identifier | First link identifier | Transmit power | Second station identifier | Second link identifier | Receive power | Cross-link signal attenuation strength | Whether there is cross-link interference |
| --- | --- | --- | --- | --- | --- | --- | --- |

FIG. 4

| First station identifier | First link identifier | Transmit power | Second station identifier | Second link identifier |
|---|---|---|---|---|

FIG. 5

| First station identifier | First link identifier | Transmit power | Second station identifier | Second link identifier | Feedback link identifier | Feedback time point | Receive power feedback threshold | Feedback type |
|---|---|---|---|---|---|---|---|---|

FIG. 6

INTERFERENCE MEASUREMENT STATION, ACCESS POINT, AND METHOD

CROSS-REFERENCE TO RELATED APPLICATIONS

This application is a continuation of International Application No. PCT/CN2020/141573, filed on Dec. 30, 2020, which claims priority to Chinese Patent Application No. 201911398248.7, filed on Dec. 30, 2019. The disclosures of the aforementioned applications are hereby incorporated by reference in their entireties.

TECHNICAL FIELD

This application relates to the field of communications technologies, and in particular, to an interference measurement station, access point, and method.

BACKGROUND

As increasingly more application traffic is carried by a wireless network, a high rate is always an evolution goal of a wireless fidelity (Wi-Fi) system. To increase a peak rate of a station, multi-link aggregation has become an alternative feature of a next-generation wireless local area network (WLAN) technology. In the next-generation WLAN technology, namely, an extremely high-throughput (EHT) system, an access point (AP) that supports multi-link operation may be connected to different stations on different links. Because these stations may be physically close to each other or working links may be close to each other in frequency, mutual adjacent-band interference between working links is caused. The AP or the station cannot learn the possible interference. As a result, normal data reception is affected. This causes interference during data exchange between different stations and the AP.

SUMMARY

A technical problem to be resolved in embodiments of this application is to provide an interference measurement station, access point, and method, to reduce a collision probability during data exchange between an access point AP and stations that interfere with each other, and to increase an overall system throughput.

According to a first aspect, an embodiment of this application provides a station, including:

a transceiver unit, configured to receive, on a second link, a measurement signal sent by a first station on a first link; and a processing unit, configured to generate a measurement result based on the received measurement signal;

the transceiver unit is further configured to send the measurement result to an access point.

In one embodiment, the measurement result includes the following fields:

a first station identifier and/or a first link identifier; a second station identifier and/or a second link identifier; and whether there is cross-link interference and/or a cross-link signal attenuation strength.

In one embodiment, the measurement result further includes one or more of the following fields:

a transmit power, used to indicate a transmit power at which the first station sends the measurement signal; and a receive power, used to indicate a receive power at which the second station receives the measurement signal.

In one embodiment, the measurement signal is any data packet sent by the first station on the first link.

Alternatively, the measurement signal is a measurement signal sent by the first station on the first link after the first station receives an interference measurement notification frame broadcast by the access point.

In one embodiment, the transceiver unit is further configured to:

receive the interference measurement notification frame broadcast by the access point, where the interference measurement notification frame carries a feedback indication used to indicate the station to feed back the measurement result; or receive a measurement result feedback notification frame sent by the access point, where the measurement result feedback notification frame is used to notify the station to feed back the measurement result.

In one embodiment, a quantity of stations is greater than or equal to one. When the quantity of stations is greater than one, the transceiver unit is further configured to receive interference information of other stations sent by the access point.

In one embodiment, the station measures interference based on a preset period.

According to a second aspect, an embodiment of this application provides a station, including:

a processing unit, configured to indicate a transceiver unit to send a measurement signal on a first link.

The transceiver unit is configured to receive interference information sent by an access point, where the interference information is generated by the access point based on a measurement result sent by a second station, and the measurement result is generated when the second station receives the measurement signal on a second link.

In one embodiment, the interference information includes:

a first link identifier; a second link identifier; a second station identifier; and whether there is cross-link interference and/or a cross-link signal attenuation strength.

In one embodiment, the measurement signal is any data packet sent by the station on the first link.

Alternatively, the measurement signal is a measurement signal sent by the station on the first link after the station receives an interference measurement notification frame broadcast by the access point.

In one embodiment, the processing unit is further configured to indicate the transceiver unit to send an interference information request frame, to request the access point to send the interference information.

According to a third aspect, an embodiment of this application provides an access point, including:

a transceiver unit, configured to receive a measurement result sent by a second station, where the measurement result is generated when the second station receives, on a second link, a measurement signal sent by a first station on a first link.

In one embodiment, the access point further includes:

a processing unit, configured to: generate interference information based on the measurement result, and indicate the transceiver unit to send the interference information to the first station.

The interference information includes: a first link identifier; a second link identifier; a second station identifier; and whether there is cross-link interference and/or a cross-link signal attenuation strength.

In one embodiment, the measurement result includes the following fields:
  a first station identifier and/or a first link identifier; a second station identifier and/or a second link identifier; and whether there is cross-link interference and/or a cross-link signal attenuation strength.

In one embodiment, the measurement result further includes one or more of the following fields:
  a transmit power, used to indicate a transmit power at which the first station sends the measurement signal; and
  a receive power, used to indicate a receive power at which the second station receives the measurement signal.

In one embodiment, the measurement signal is any data packet sent by the first station on the first link.

Alternatively, the transceiver unit is further configured to broadcast an interference measurement notification frame, where the interference measurement notification frame is used to indicate the first station to send the measurement signal on the first link.

In one embodiment, the transceiver unit is further configured to:
  carry, in the interference measurement notification frame, a feedback indication used to indicate the second station to feed back the measurement result; or
  send a measurement result feedback notification frame to the second station, where the measurement result feedback notification frame is used to notify the second station to feed back the measurement result.

In one embodiment, the interference measurement notification frame includes the following fields:
  the first station identifier and/or the first link identifier; the transmit power, used to indicate a transmit power at which the first station sends the measurement signal; and the second station identifier and/or the second link identifier.

In one embodiment, the interference measurement notification frame further includes one or more of the following fields:
  a feedback link identifier, used to indicate a link on which the second station feeds back the measurement result;
  a feedback time point, used to indicate a time point at which the second station feeds back the measurement result;
  a receive power feedback threshold, used to indicate a threshold at which the second station feeds back the receive power; and
  a feedback type, used to indicate a type of information used by the second station to feed back a cross-link interference strength.

In one embodiment, the access point is further configured to measure interference based on a preset period.

In one embodiment, the processing unit is further configured to select a time and a link, to send the interference information to the first station. Alternatively, the transceiver unit is further configured to receive an interference information request frame sent by the first station, and send the interference information to the first station.

In one embodiment, a quantity of second stations is greater than or equal to one, and when the quantity of second stations is greater than one, the access point is further configured to send the interference information to one or more other second stations.

According to a fourth aspect, an embodiment of this application provides an interference measurement method, including:

A second station receives, on a second link, a measurement signal sent by the first station on the first link.

The second station generates a measurement result based on the received measurement signal.

The second station sends the measurement result to an access point.

In one embodiment, the measurement result includes the following fields:
  a first station identifier and/or a first link identifier; a second station identifier and/or a second link identifier; and whether there is cross-link interference and/or a cross-link signal attenuation strength.

In one embodiment, the measurement result further includes one or more of the following fields:
  a transmit power, used to indicate a transmit power at which the first station sends the measurement signal; and
  a receive power, used to indicate a receive power at which the second station receives the measurement signal.

In one embodiment, the measurement signal is any data packet sent by the first station on the first link.

Alternatively, the measurement signal is a measurement signal sent by the first station on the first link after the first station receives an interference measurement notification frame broadcast by the access point.

In one embodiment, before that the second station sends the measurement result to an access point, the method is further configured to:
  receive, by the second station, an interference measurement notification frame broadcast by the access point, where the interference measurement notification frame carries a feedback indication used to indicate the second station to feed back the measurement result; or
  receive, by the second station, a measurement result feedback notification frame sent by the access point, where the measurement result feedback notification frame is used to notify the second station to feed back the measurement result.

According to a fifth aspect, an embodiment of this application provides a station, including:
  a processor, a memory, and a bus, where the processor and the memory are connected through the bus, the memory is configured to store a group of program code, and the processor is configured to invoke the program code stored in the memory to perform the method according to any one of the fourth aspect or the implementations according to the fourth aspect.

According to a sixth aspect, an embodiment of this application provides an interference measurement method, including:

A first station sends a measurement signal on a first link.

The first station receives interference information sent by an access point, where the interference information is generated by the access point based on a measurement result sent by a second station, and the measurement result is generated when the second station receives the measurement signal on a second link.

In one embodiment, the interference information includes:
  a first link identifier; a second link identifier; a second station identifier; and whether there is cross-link interference and/or a cross-link signal attenuation strength.

In one embodiment, the measurement signal is any data packet sent by the station on the first link.

Alternatively, the measurement signal is a measurement signal sent by the station on the first link after the station receives an interference measurement notification frame broadcast by the access point.

According to a seventh aspect, an embodiment of this application provides a station, including:

a processor, a memory, and a bus, where the processor and the memory are connected through the bus, the memory is configured to store a group of program code, and the processor is configured to invoke the program code stored in the memory to perform the method according to any one of the sixth aspect or the implementations of the sixth aspect.

According to an eighth aspect, an embodiment of this application provides an interference measurement method, including:

An access point receives a measurement result sent by a second station, where the measurement result is generated when the second station receives, on a second link, a measurement signal sent by a first station on a first link.

In one embodiment, the method further includes:

The access point generates interference information based on the measurement result, and sends the interference information to the first station.

The interference information includes: a first link identifier; a second link identifier; a second station identifier; and whether there is cross-link interference and/or a cross-link signal attenuation strength.

In one embodiment, the measurement result includes the following fields:

a first station identifier and/or the first link identifier; the second station identifier and/or the second link identifier; and whether there is cross-link interference and/or a cross-link signal attenuation strength.

In one embodiment, the measurement result further includes one or more of the following fields:

a transmit power, used to indicate a transmit power at which the first station sends the measurement signal; and a receive power, used to indicate a receive power at which the second station receives the measurement signal.

In one embodiment, the measurement signal is any data packet sent by the first station on the first link.

Alternatively, the method further includes: The access point broadcasts an interference measurement notification frame, where the interference measurement notification frame is used to indicate the first station to send the measurement signal on the first link.

In one embodiment, the method further includes:

The access point carries in the interference measurement notification frame, a feedback indication used to indicate the second station to feed back the measurement result.

Alternatively, the access point sends a measurement result feedback notification frame to the second station, where the measurement result feedback notification frame is used to notify the second station to feed back the measurement result.

In one embodiment, the interference measurement notification frame includes the following fields:

the first station identifier and/or the first link identifier; the transmit power, used to indicate a transmit power at which the first station sends the measurement signal; and the second station identifier and/or the second link identifier.

In one embodiment, the interference measurement notification frame further includes one or more of the following fields:

a feedback link identifier, used to indicate a link on which the second station feeds back the measurement result;

a feedback time point, used to indicate a time point at which the second station feeds back the measurement result;

a receive power feedback threshold, used to indicate a threshold at which the second station feeds back the receive power; and a feedback type, used to indicate a type of information used by the second station to feed back a cross-link interference strength.

According to a ninth aspect, an embodiment of this application provides an access point, including:

a processor, a memory, and a bus, where the processor and the memory are connected through the bus, the memory is configured to store a group of program code, and the processor is configured to invoke the program code stored in the memory to perform the method according to any one of the eighth aspect or the implementations of the eighth aspect.

According to a tenth aspect, an embodiment of this application provides an apparatus. The apparatus provided in this application has a function of implementing behavior of an access point or a station in the foregoing method aspects, and includes corresponding components (means) configured to perform the operations or functions described in the foregoing method aspects. The operations or the functions may be implemented by using software, hardware (for example, a circuit), or a combination of hardware and software.

In one embodiment, the apparatus includes one or more processors and communications units. The one or more processors are configured to support the apparatus to perform corresponding functions of the terminal in the foregoing methods. In one embodiment, the apparatus may further include one or more memories. The memory is configured to couple to the processor, and the memory stores program instructions and/or data that are/is necessary for the apparatus. The one or more memories may be integrated with the processor, or may be disposed separately from the processor, which is not limited in this application.

The apparatus may be a communications server, a router, a switch, a computer, an intelligent terminal, or the like. The communications unit may be a transceiver or a transceiver circuit. In one embodiment, the transceiver may alternatively be an input/output circuit or an interface.

The apparatus may alternatively be a communications chip. The communications unit may be an input/output circuit or an interface of the communications chip.

In another embodiment, the foregoing apparatus includes a transceiver, a processor, and a memory. The processor is configured to control the transceiver or the input/output circuit to receive and send a signal. The memory is configured to store a computer program. The processor is configured to run the computer program in the memory, to enable the apparatus to perform the method completed by the access point according to any one of the eighth aspect or the possible implementations of the eighth aspect.

In one embodiment, the apparatus includes one or more processors and communications units. The one or more processors are configured to support the apparatus to perform corresponding functions of the station in the foregoing methods. In one embodiment, the apparatus may further include one or more memories. The memory is configured to couple to the processor, and the memory stores program instructions and/or data that are/is necessary for a network device. The one or more memories may be integrated with the processor, or may be disposed separately from the processor, which is not limited in this application.

The apparatus may be a computer, an intelligent terminal, a wearable device, or the like. The communications unit may be a transceiver or a transceiver circuit. In one embodiment, the transceiver may alternatively be an input/output circuit or an interface.

The apparatus may alternatively be a communications chip. The communications unit may be an input/output circuit or an interface of the communications chip.

In another embodiment, the foregoing apparatus includes a transceiver, a processor, and a memory. The processor is configured to control the transceiver or the input/output circuit to receive and send a signal. The memory is configured to store a computer program. The processor is configured to run the computer program in the memory, to enable the apparatus to perform the method completed by the station according to any one of the fourth aspect or the possible implementations of the fourth aspect; or perform the method completed by the station according to any one of the sixth aspect or the possible implementations of the sixth aspect.

According to an eleventh aspect, a system is provided. The system includes the foregoing access point and two types of stations.

According to a twelfth aspect, a computer-readable storage medium is provided and is configured to store a computer program. The computer program includes instructions used to perform the method according to any one of the fourth aspect or the possible implementations of the fourth aspect.

According to a thirteenth aspect, a computer-readable storage medium is provided and is configured to store a computer program. The computer program includes instructions used to perform the method according to any one of the sixth aspect or the possible implementations of the sixth aspect.

According to a fourteenth aspect, a computer-readable storage medium is provided and is configured to store a computer program. The computer program includes instructions used to perform the method according to any one of the eighth aspect or the possible implementations of the eighth aspect.

According to a fifteenth aspect, a computer program product is provided. The computer program product includes computer program code. When the computer program code is run on a computer, the computer is enabled to perform the method according to any one of the fourth aspect or the possible implementations of the fourth aspect.

According to a sixteenth aspect, a computer program product is provided. The computer program product includes computer program code. When the computer program code is run on a computer, the computer is enabled to perform the method according to any one of the sixth aspect or the possible implementations of the sixth aspect.

According to a seventeenth aspect, a computer program product is provided. The computer program product includes computer program code. When the computer program code is run on a computer, the computer is enabled to perform the method according to any one of the eighth aspect or the possible implementations of the eighth aspect.

BRIEF DESCRIPTION OF DRAWINGS

To describe technical solutions in embodiments of this application or in the background more clearly, the following briefly describes the accompanying drawings used for describing the embodiments of this application or the background.

FIG. 4 is a schematic diagram of another frame structure of a field included in a measurement result;

FIG. 5 is a schematic diagram of a frame structure of a field included in an interference measurement notification frame;

FIG. 6 is a schematic diagram of another frame structure of a field included in an interference measurement notification frame;

DESCRIPTION OF EMBODIMENTS

The following describes the embodiments of this application with reference to the accompanying drawings in the embodiments of this application.

The terms "comprising", "including", or any other variant thereof mentioned in the specification, claims, and the accompanying drawings of the embodiments of this application, are intended to cover a non-exclusive inclusion. For example, a process, a method, a system, a product, or a device that includes a series of operations or units is not limited to the listed operations or units, but In one embodiment further includes an unlisted operation or unit, or In one embodiment further includes another inherent operation or unit of the process, the method, the product, or the device.

Figure 1:
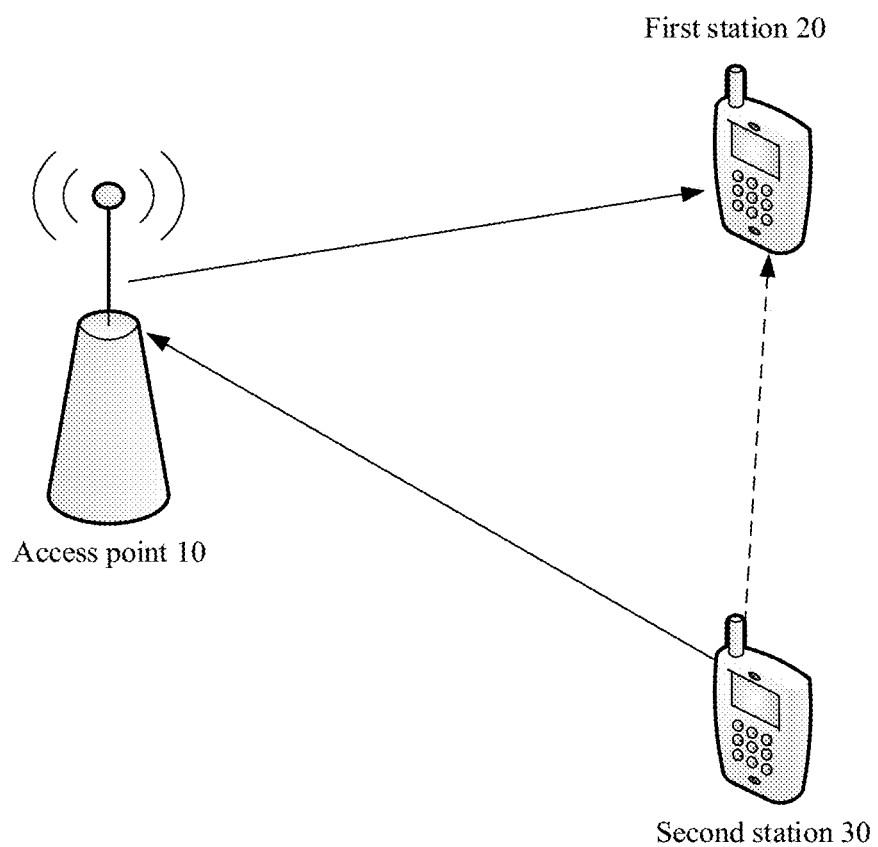
FIG. 1 is a schematic diagram of an architecture of a communications system according to an embodiment of this application.

FIG. 1 is a schematic diagram of an architecture of a communications system according to an embodiment of this application. For ease of description and understanding, only one access point and two stations are shown in the architecture shown in FIG. 1, and communication between an access point and a station is used as an example for description. It may be understood that, in an actual scenario, the communications system may further include a plurality of stations or access points. In addition to communication between an access point and a station, the communications system may also be used in communication between access points and communication between stations. This is not limited in the embodiments of this application.

The architecture shown in FIG. 1 includes an access point 10, a first station 20, and a second station 30.

The access point 10 is a device that accesses a network for a wireless local area network (WLAN) user terminal (including the first station 20 and the second station 30). The device may be a communications server, a router, a switch, a bridge, a computer, a mobile phone, or the like.

The first station 20 and the second station 30 may be user terminals that need to communicate with the network. The user terminal may also be referred to as a mobile terminal, a terminal device, a user equipment, or the like. The user terminal may be a computer, a mobile phone, a tablet computer, a handheld device, an augmented reality (AR) device, a virtual reality (VR) device, a machine type communications terminal, or another device that can access the network.

In this embodiment of this application, the first station 20 and the second station 30 are located within signal coverage of the access point. The access point, the first station 20, and the second station 30 may be located in a basic service set (BSS). Because locations of the two stations are close or frequencies of working links of the two stations are close, when the two stations simultaneously communicate with the access point, mutual interference occurs. Therefore, proper scheduling is required to avoid or reduce the interference.

The following describes in detail an interference measurement method in this application with reference to FIG. 2 to FIG. 5.

Figures 2, 3:
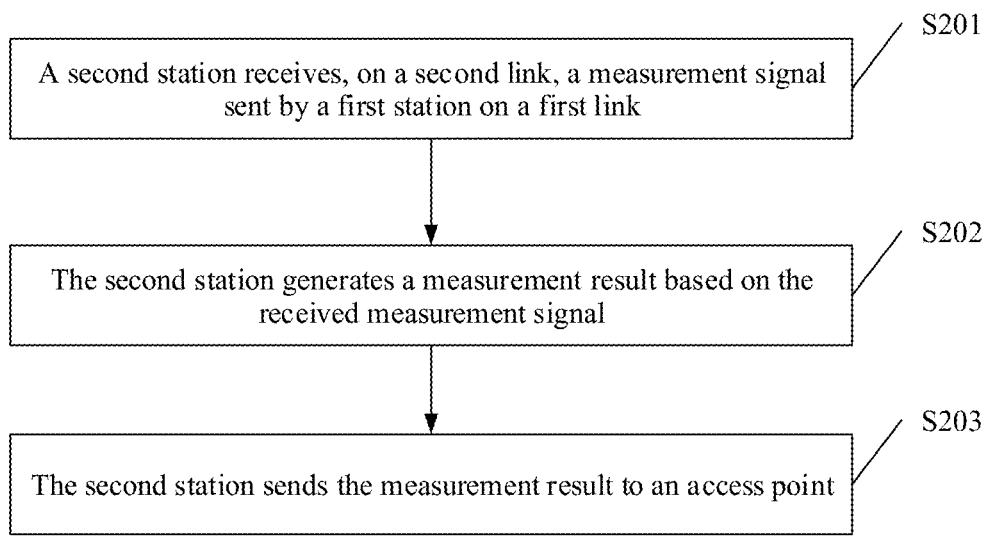
FIG. 2 is a schematic flowchart of an interference measurement method according to an embodiment of this application.
FIG. 3 is a schematic diagram of a frame structure of a field included in a measurement result.

FIG. 2 is a schematic flowchart of an interference measurement method according to an embodiment of this application. The method specifically includes the following operations.

S201: A second station receives, on a second link, a measurement signal sent by a first station on a first link.

In one embodiment, the measurement signal may be any data packet sent by the first station on the first link. The second station may select, based on a preset period, one data packet on the second link to perform interference measurement. The second station may alternatively randomly select one data packet to perform interference measurement. This is not limited in the embodiments of this application.

Alternatively, the measurement signal may be a measurement signal sent by the first station on the first link after the first station receives an interference measurement notification frame broadcast by an access point. In this case, before operation S201, the method may further include operation S200: The access point broadcasts the interference measurement notification frame, to notify the first station to send the measurement signal on the first link, and notify the second station to listen to the measurement signal on the second link.

The second link is a broad concept and is used to distinguish from the first link. The second link may be specifically any link other than the first link. Essentially, links used by the second station to listen to the measurement signal may be collectively referred to as receive links used for testing.

In one embodiment, the access point may specify one or more second stations to be ready to receive the measurement signal. Alternatively, the access point may not specify a station. If the access point does not specify a station, the second station may autonomously determine whether to perform measurement. The interference measurement notification frame may be a newly defined frame, or an existing frame in a protocol may be reused (For example, a null data packet announcement (NDPA) frame).

S202: The second station generates a measurement result based on the received measurement signal.

FIG. 3 is a schematic diagram of a frame structure of a field included in a measurement result, and the frame may specifically include the following fields:

a first station identifier and/or a first link identifier; a second station identifier and/or a second link identifier; and whether there is cross-link interference and/or a cross-link signal attenuation strength.

Whether there is cross-link interference is used to qualitatively indicate whether there is interference on two links between two stations. Whether there is cross-link interference may be a Boolean variable, for example, 1 indicates that there is the interference, and 0 indicates that there is no interference. Specifically, whether there is cross-link interference may be obtained by comparing a receive power with an interference cancellation capability of the station device.

The first station identifier specifies a station that sends the measurement signal. The first link identifier specifies a link on which the first station sends the measurement signal (There may be a one-to-one correspondence between the two pieces of information, and only one of the two pieces of information may be included). The second station identifier specifies a station that needs to receive the measurement signal. The second link identifier specifies a link on which the second station receives the measurement signal (There may be a one-to-one correspondence between the two pieces of information, and only one of the two pieces of information may be included). A link identifier may be set to a link address or another form, for example, an integer, of identification information. For a station that supports only a single-link operation, a link address of the station is the same as a station address, and a link identifier of the station may be the same as a station identifier (or may be set to a mapping relationship). In this case, one of the link identifier and the station identifier may be selected to be sent. For a station that supports a multi-link operation, all link addresses of the station may be the same as a station address. Therefore, a link identifier needs to be used to distinguish different links. In this case, a station identifier and the link identifier may be simultaneously sent. Another possibility is that the link addresses of the stations that support the multi-link operation may be different. In this case, the station identifier and the link identifier may be sent, (for example, the link identifier may be set to a link address), to distinguish different links.

The cross-link signal attenuation strength is used to indicate a measurement signal attenuation strength from a first link of the first station to a second link of the second station.

After receiving the measurement signal, the second station may obtain a receive power of the measurement signal, to determine, based on a comparison between the receive power and an interference cancellation capability of the second station, whether there is the cross-link interference. Specifically, for the second station, to determine whether an external signal such as the measurement signal in this application interferes with the device, a ratio of a transmit power of the second station to a receive power of an interference signal needs to be calculated (that is, a signal to interference plus noise ratio is calculated), and the ratio is compared with an anti-interference threshold of the second station. If the ratio is greater than the threshold, it is determined that the interference does not affect a normal transmitting and receiving function. Otherwise, the transmitting and receiving function is affected.

Alternatively, when obtaining a transmit power of the measurement signal on the first link, the second station may further determine the cross-link signal attenuation strength based on the receive power. If the transmit power of the measurement signal on the first link is known, the transmit power may be divided by the receive power. A ratio of the two powers is an attenuation strength (it is assumed that the attenuation strength is L). In wireless communication, (10* logL) value conversion is usually performed on L, to convert L into a decibel (dB) unit. For example, if the ratio is 100, the attenuation strength is 20 dB.

Certainly, in addition to receiving the measurement signal on the second link, the second station may further receive the measurement signal on the first link, and determine the cross-link signal attenuation strength based on the receive power obtained on the first link and inter-link loss data prestored on the second station. For example, the second station prestores the inter-link loss data (it is assumed that a loss value of the first link and the second link is 20 dB, that is, a cross-link signal power needs to be divided by 100). Based on the receive power on the first link (it is assumed that the receive power is 1 W), an equivalent receive power 0.01 W on the second link may be obtained by dividing the receive power on the first link by 100. Then, the cross-link signal attenuation strength is calculated based on a ratio of the transmit power to the equivalent receive power.

By using the foregoing fields, the access point may learn whether there is interference and an interference strength when the two stations simultaneously communicate with each other on the first link and the second link. Therefore, during scheduling, a collision probability between the two stations can be reduced through proper arrangement, and an overall throughput of the communications system can be improved.

In one embodiment, FIG. 4 is a schematic diagram of another frame structure of a field included in a measurement result, and may specifically include one or more of the following fields:

a transmit power, used to indicate a transmit power at which the first station sends the measurement signal; or
 a receive power, used to indicate a receive power at which the second station receives the measurement signal.

When the second station receives and tests measurement signals on a plurality of links, the second link identifier, the receive power, and a ratio of the receive power to the transmit power may include a plurality of groups of information corresponding to the plurality of links, to correspond to measurement results of the second station on the plurality of links. For example, a second link 1 corresponds to a second link identifier 1, a receive power 1, and a ratio 1 of a receive power to a transmit power, and a second link 2 corresponds to a second link identifier 2, a receive power 2, and a ratio 2 of a receive power to a transmit power.

S203: The second station sends the measurement result to an access point.

In one embodiment, before that the second station sends the measurement result to an access point, the method may further include:

The second station receives an interference measurement notification frame broadcast by the access point, where the interference measurement notification frame carries a feedback indication used to indicate the second station to feed back the measurement result.

Alternatively, the second station receives a measurement result feedback notification frame sent by the access point, where the measurement result feedback notification frame is used to notify the second station to feed back the measurement result.

To notify the second station to feed back the measurement result, the access point may carry a feedback indication in the interference measurement notification frame. A feedback manner (for example, a feedback link, a feedback time point, and a feedback type) of the second station may be specified by using the feedback indication, and the second station may feed back the measurement result to the access point in the specified manner. If there are a plurality of second stations, one interference measurement notification frame may be sent to each second station, and each second station may feed back the measurement result of the second station in a manner specified by the second station. Alternatively, a same interference measurement notification frame may be sent to all second stations, and a link and a time point for sending the measurement result by different second stations are specified. In one embodiment, the second station performs channel contention on a freely selected link, and feeds back the measurement result to the access point. Measurement results fed back by different second stations may be simultaneously sent or may not be simultaneously sent.

In addition to indicating in the interference measurement notification frame, the access point may also send a measurement result feedback notification frame to the second station, to indicate the second station to feed back the measurement result. When there are a plurality of second stations, In one embodiment, the access point may send a measurement result feedback notification frame to each second station, to request the measurement result.

In one embodiment, FIG. 5 is a schematic diagram of a frame structure of a field included in an interference measurement notification frame. The interference measurement notification frame may include the following fields:

a first station identifier and/or a first link identifier; a transmit power, used to indicate a transmit power at which the first station sends the measurement signal; and a second station identifier and/or a second link identifier.

In one embodiment, FIG. 6 is a schematic diagram of another frame structure of a field included in an interference measurement notification frame. The interference measurement notification frame may further include one or more of the following fields:

a feedback link identifier, used to indicate a link on which the second station feeds back the measurement result;
 a feedback time point, used to indicate a time point at which the second station feeds back the measurement result;
 a receive power feedback threshold, used to indicate a threshold at which the second station feeds back the receive power; and
 a feedback type, used to indicate a type of information used by the second station to feed back a cross-link interference strength.

When there are a plurality of second stations, the second station identifier, the second link identifier, the feedback link identifier, and the feedback time point may include a plurality of groups of information corresponding to receiving manners and feedback manners of the plurality of the second stations. The second station identifier specifies a station that needs to receive the measurement signal. The second link identifier specifies a link on which the second station receives the measurement signal (The two pieces of information may have a one-to-one correspondence, and the interference measurement notification frame may include only one of the two pieces of information). The feedback link identifier specifies a link on which the second station feeds back the measurement result. The feedback time point specifies a time point at which the second station feeds back the measurement result. The access point may use a special value such as 0 of a second station identifier field to specify that all second stations receive the measurement signal, or may use a special value such as 0 of a receive link identifier field to specify that the corresponding second station receives the measurement signal on all links. A receive power feedback threshold field specifies a minimum value of a receive power of the second station. When the receive power is less than the feedback threshold, the second station does not feed back a specific receive power. A feedback type field specifies a type of information indicating a cross-link interference strength that is fed back by the second station to the access point after the second station receives the measurement signal. The feedback type may be an absolute value of the receive power of the measurement signal or a relative value of the receive power relative to the transmit power of the measurement signal. Alternatively, the feedback type may be a Boolean value that identifies whether there is cross-link interference.

After the access point receives the measurement result fed back by the second station, the access point may generate interference information based on the measurement result, and send the interference information to the first station. For example, the access point may extract information related to cross-link interference between the second station and the first station in the measurement result, and send the information to the first station. When there are the plurality of second stations, the access point may separately extract information related to cross-link interference between each second station and the first station, and send the information to the first station. Alternatively, the access point may summarize information related to cross-link interference between the plurality of second stations and the first station, and then send the information to the first station.

In one embodiment, the access point may select a time point and a link (It should be ensured that the first station can normally receive the interference information on the selected time point and link), to send the interference information to the first station.

Alternatively, the access point may receive an interference information request frame sent by the first station, and send the interference information to the first station.

Figures 7, 8:
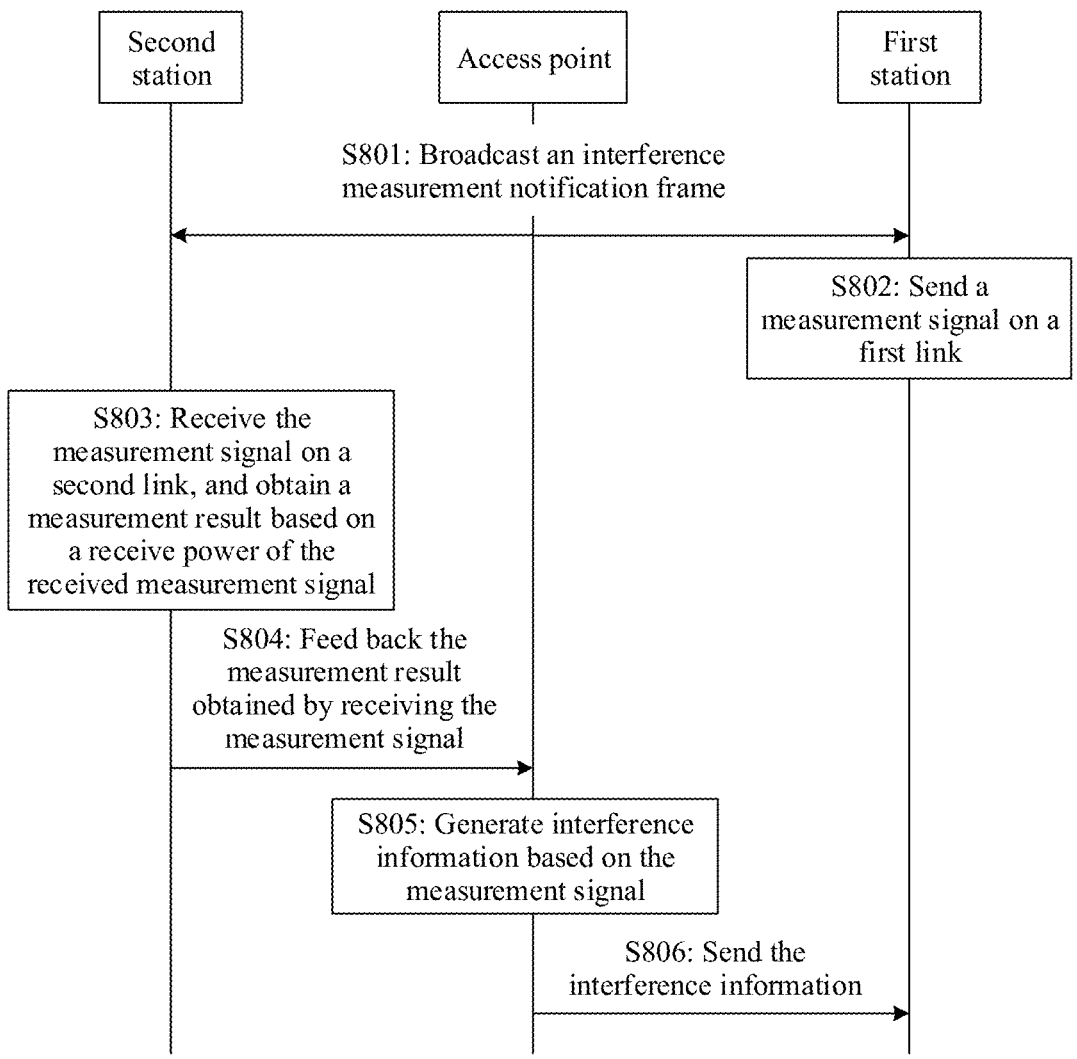
FIG. 7 is a schematic diagram of a frame structure of a field included in interference information.
FIG. 8 is a schematic flowchart of another interference measurement method according to an embodiment of this application.

FIG. 7 is a schematic diagram of a frame structure of a field included in interference information. The interference information may include the following fields:

a first link identifier; a second link identifier; a second station identifier; and whether there is cross-link interference and/or a cross-link signal attenuation strength.

It should be noted that the frame structures shown in FIG. 3 to FIG. 7 do not limit an arrangement order of the fields.

In addition, a quantity of second stations is greater than or equal to one, and when the quantity of second stations is greater than one, the method further includes:

The access point sends the interference information to one or more other second stations.

When there are a plurality of access points, an interference measurement method is similar, and details are not described herein again.

It should be noted that, because a physical location or frequency of the working link of the access point or the station may change, the second station may perform interference measurement based on a preset period. By periodically performing interference measurement and updating information, the system may run stably for long time.

In this embodiment of this application, by measuring cross-link interference and reporting a result of the cross-link interference, the access point may store interference statuses on different links between all associated stations, and the station may also store information about another station having cross-link interference with the station and a corresponding interference level. After the interference statues are known, the access point may avoid simultaneously sending data packets to two stations that interfere with each other. When detecting that the interference station is sending data to the access point, each station should also avoid sending data to the access point. Therefore, a collision probability of sending data of different stations is reduced. This improves an overall throughput and improves system running efficiency.

FIG. 8 is a schematic flowchart of another interference measurement method according to an embodiment of this application. The method may include the following operations.

S801: An access point broadcasts an interference measurement notification frame to a first station and a second station.

S802: The first station sends a measurement signal on a first link.

In one embodiment, when operation S301 does not exist, the measurement signal may be any data packet sent by the first station on the first link.

S803: The second station receives the measurement signal on a second link, and generates a measurement result based on a receive power of the received measurement signal.

For example, a receive power may be directly fed back in the measurement result, and the access point determines, based on the receive power and a transmit power of the measurement signal, whether there is cross-link interference, or calculates a cross-link signal attenuation strength. Alternatively, the second station may determine, based on a receive power and a transmit power of the measurement signal, whether there is cross-link interference, or calculate a cross-link signal attenuation strength.

S804: The second station feeds back, to the access point, the measurement result obtained by receiving the measurement signal.

S805: The access point generates interference information based on the measurement result.

S806: The access point sends the interference information to the first station.

For concepts involved in this embodiment and meanings and content included in the concepts, refer to description in the embodiment shown in FIG. 2. Details are not described herein again.

Figure 9:
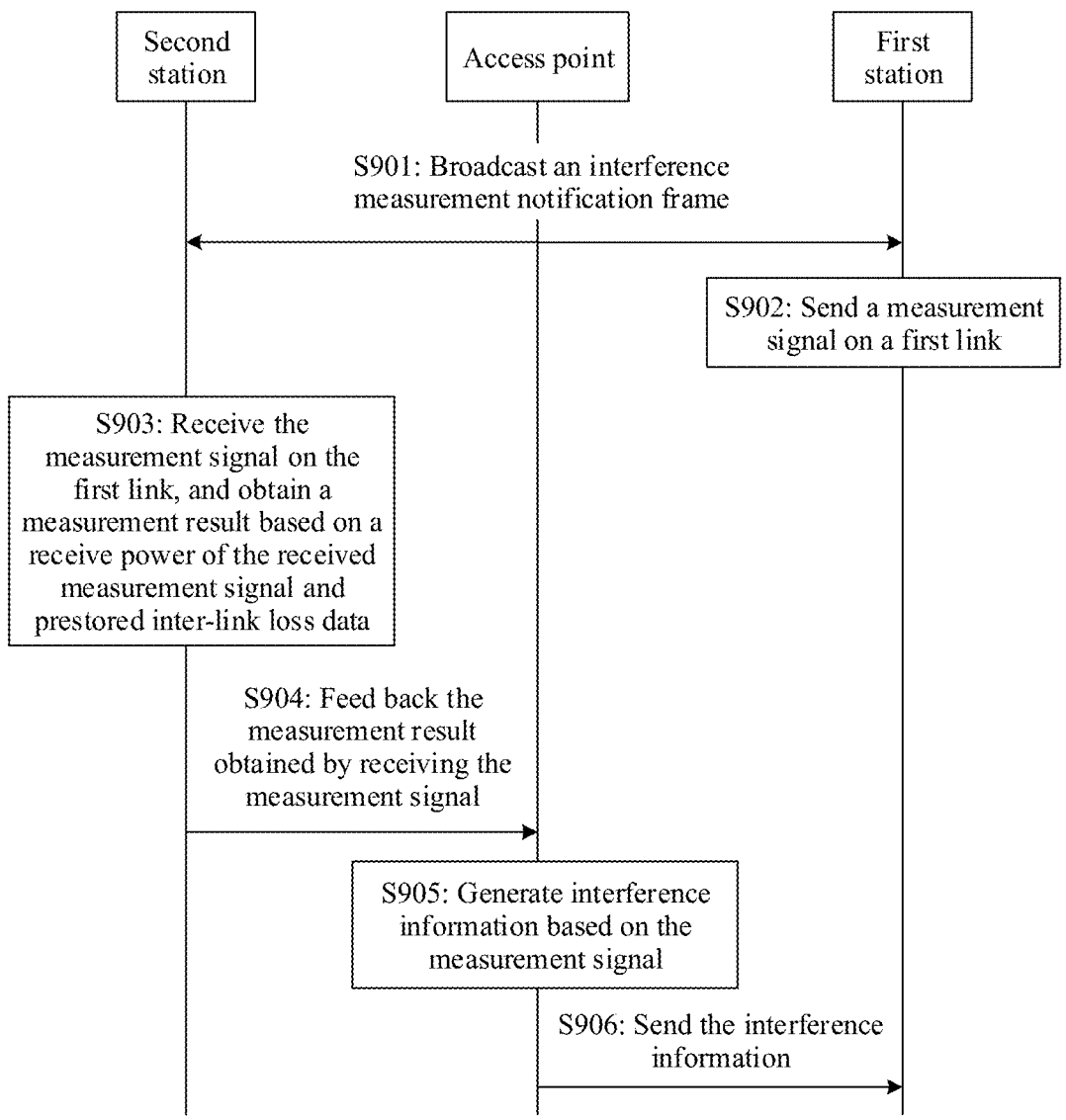
FIG. 9 is a schematic flowchart of still another interference measurement method according to an embodiment of this application.

FIG. 9 is a schematic flowchart of still another interference measurement method according to an embodiment of this application. In this embodiment, the following operations may be included.

S901: An access point broadcasts an interference measurement notification frame to a first station and a second station.

S902: The first station sends a measurement signal on a first link.

S903: The second station receives the measurement signal on the first link, and obtains a measurement result based on a receive power of the received measurement signal and prestored inter-link loss data.

The inter-link loss data may be prestored in the second station. With reference to the description in the embodiment in FIG. 2, the second station may convert a co-link interference strength into a cross-link interference strength through internal processing.

S904: The second station feeds back, to the access point, the measurement result obtained by receiving the measurement signal.

S905: The access point generates interference information based on the measurement result.

S906: The access point sends the interference information to the first station.

For concepts involved in this embodiment and meanings and content included in the concepts, refer to description in the embodiment shown in FIG. 2. Details are not described herein again.

Figure 10:
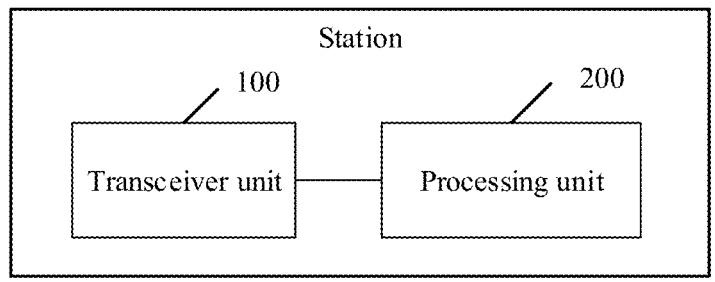
FIG. 10 is a schematic composition diagram of a station according to an embodiment of this application.

FIG. 10 is a schematic composition diagram of a station according to an embodiment of this application. The station may include:

a transceiver unit 100, configured to receive, on a second link, a measurement signal sent by a first station on a first link; and a processing unit 200, configured to generate a measurement result based on the received measurement signal.

The transceiver unit 100 is further configured to send the measurement result to an access point.

In one embodiment, the measurement result includes the following fields:

a first station identifier and/or a first link identifier; a second station identifier and/or a second link identifier; and whether there is cross-link interference and/or a cross-link signal attenuation strength.

In one embodiment, the measurement result further includes one or more of the following fields:

a transmit power, used to indicate a transmit power at which the first station sends the measurement signal; and a receive power, used to indicate a receive power at which the second station receives the measurement signal.

In one embodiment, the measurement signal is any data packet sent by the first station on the first link.

Alternatively, the measurement signal is a measurement signal sent by the first station on the first link after the first station receives an interference measurement notification frame broadcast by the access point.

In one embodiment, the transceiver unit 100 is further configured to:

receive the interference measurement notification frame broadcast by the access point, where the interference measurement notification frame carries a feedback indication used to indicate the station to feed back the measurement result; or receive a measurement result feedback notification frame sent by the access point, where the measurement result feedback notification frame is used to notify the station to feed back the measurement result.

For a concept, explanation, detailed description, and other operations that are related to the station and the technical solution provided in this embodiment of this application, refer to description about the content related to the second station in the foregoing method embodiment. Details are not described herein again.

Figure 11:
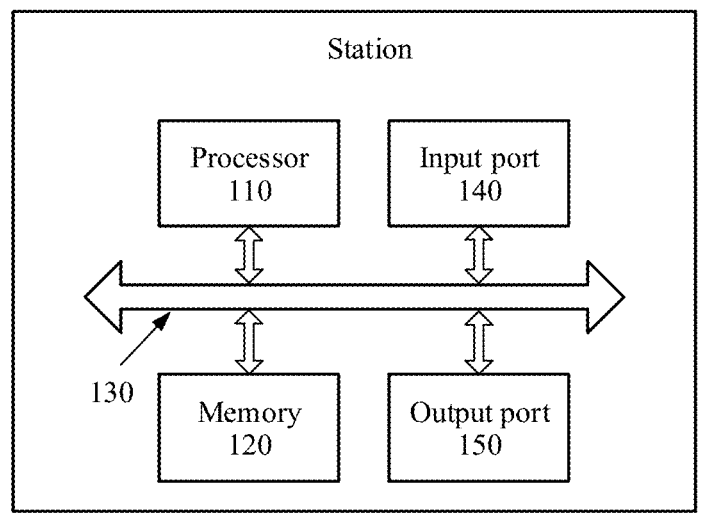
FIG. 11 is a schematic composition diagram of another station according to an embodiment of this application.

FIG. 11 is a schematic composition diagram of another station according to an embodiment of this application. The station may include a processor 110, a memory 120, and a bus 130. The processor 110 and the memory 120 are connected through the bus 130. The memory 120 is configured to store instructions. The processor 110 is configured to execute the instructions stored in the memory 120, to implement the operations in the methods corresponding to FIG. 2, and FIG. 8 and FIG. 9.

Further, the station may further include an input port 140 and an output port 150. The processor 110, the memory 120, the input port 140, and the output port 150 may be connected through the bus 130.

The processor 110 is configured to execute the instructions stored in the memory 120, to control the input port 140 to receive a signal and control the output port 150 to send a signal, to complete the operations performed by the second station in the foregoing method. The input port 140 and the output port 150 may be a same physical entity or different physical entities. When the input port 140 and the output port 150 are a same physical entity, the input port 140 and the output port 150 may be collectively referred to as input and output ports. The memory 120 may be integrated into the processor 110, or may be disposed separately from the processor 110.

In an implementation, functions of the input port 140 and the output port 150 may be implemented by using a transceiver circuit or a dedicated transceiver chip. The processor 110 may be implemented by using a dedicated processing chip, a processing circuit, a processor, or a general-purpose chip.

In another implementation, the station provided in this embodiment of this application may be implemented in a form of a general-purpose computer. To be specific, program code used to implement functions of the processor 110, the input port 140, and the output port 150 is stored in the memory, and a general-purpose processor executes the code in the memory, to implement the functions of the processor 110, the input port 140, and the output port 150.

For a concept, explanation, detailed description, and other operations that are related to the station and the technical solution provided in this embodiment of this application, refer to description about the content related to the second station in the foregoing method or another embodiment. Details are not described herein again.

Figure 12:
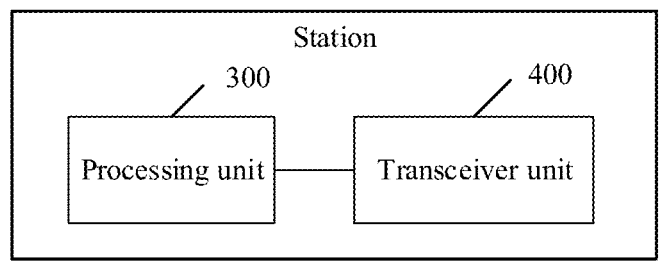
FIG. 12 is a schematic composition diagram of a station according to an embodiment of this application.

FIG. 12 is a schematic composition diagram of a station according to an embodiment of this application, and may include:

a processing unit 300, configured to indicate a transceiver unit to send a measurement signal on a first link; and a transceiver unit 400 is configured to receive interference information sent by an access point, where the interference information is generated by the access point based on a measurement result sent by a second station, and the measurement result is generated when the second station receives the measurement signal on a second link.

In one embodiment, the interference information includes:

a first link identifier; a second link identifier; a second station identifier; and whether there is cross-link interference and/or a cross-link signal attenuation strength.

In one embodiment, the measurement signal is any data packet sent by the station on the first link.

Alternatively, the measurement signal is a measurement signal sent by the station on the first link after the station receives an interference measurement notification frame broadcast by the access point.

For a concept, explanation, detailed description, and other operations that are related to the station and the technical solution provided in this embodiment of this application, refer to description about the content related to the first station in the foregoing method or another embodiment. Details are not described herein again.

Figure 13:
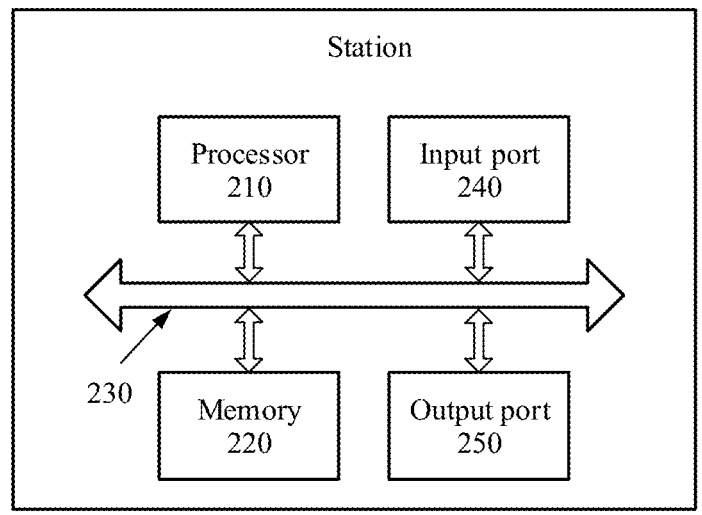
FIG. 13 is a schematic composition diagram of another station according to an embodiment of this application.

FIG. 13 is a schematic composition diagram of another station according to an embodiment of this application. The station may include a processor 210, a memory 220, and a bus 230. The processor 210 and the memory 220 are connected through the bus 230. The memory 220 is configured to store instructions. The processor 210 is configured to execute the instructions stored in the memory 220, to implement operations performed by the first station in the methods corresponding to FIG. 2, and FIG. 8 and FIG. 9.

Further, the station may further include an input port 240 and an output port 250. The processor 210, the memory 220, the input port 240, and the output port 250 may be connected through the bus 230.

The processor 210 is configured to execute the instructions stored in the memory 220, to control the input port 240 to receive a signal and control the output port 250 to send a signal, to complete the operations performed by the first station in the foregoing method. The input port 240 and the output port 250 may be a same physical entity or different physical entities. When the input port 240 and the output port 250 are a same physical entity, the input port 240 and the output port 250 may be collectively referred to as input and output ports. The memory 220 may be integrated into the processor 210, or may be disposed separately from the processor 210.

In an implementation, functions of the input port 240 and the output port 250 may be implemented by using a transceiver circuit or a dedicated transceiver chip. The processor 210 may be implemented by using a dedicated processing chip, a processing circuit, a processor, or a general-purpose chip.

In another implementation, the station provided in this embodiment of this application may be implemented in a form of a general-purpose computer. To be specific, program code that implements functions of the processor 210, the input port 240, and the output port 250 is stored in the memory, and a general-purpose processor executes the code in the memory, to implement the functions of the processor 210, the input port 240, and the output port 250.

For a concept, explanation, detailed description, and other operations that are related to the station and the technical solution provided in this embodiment of this application, refer to description about the content related to the first station in the foregoing method or another embodiment. Details are not described herein again.

Figure 14:
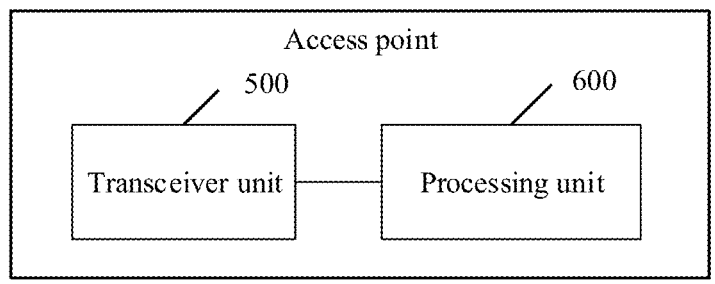
FIG. 14 is a schematic composition diagram of an access point according to an embodiment of this application.

FIG. 14 is a schematic composition diagram of an access point according to an embodiment of this application, and may include:

a transceiver unit 500, configured to receive a measurement result sent by a second station, where the measurement result is generated when the second station receives, on a second link, a measurement signal sent by a first station on a first link.

In one embodiment, the access point further includes:

a processing unit 600, configured to generate interference information based on the measurement result, and indicate the transceiver unit 500 to send the interference information to the first station.

The interference information includes: a first link identifier; a second link identifier; a second station identifier; and whether there is cross-link interference and/or a cross-link signal attenuation strength.

In one embodiment, the measurement result includes the following fields:

a first station identifier and/or the first link identifier; the second station identifier and/or the second link identifier; and whether there is cross-link interference and/or a cross-link signal attenuation strength.

In one embodiment, the measurement result further includes one or more of the following fields:

a transmit power, used to indicate a transmit power at which the first station sends the measurement signal; and a receive power, used to indicate a receive power at which the second station receives the measurement signal.

In one embodiment, the measurement signal is any data packet sent by the first station on the first link.

Alternatively, the transceiver unit is further configured to broadcast an interference measurement notification frame, where the interference measurement notification frame is used to indicate the first station to send the measurement signal on the first link.

In one embodiment, the transceiver unit 500 is further configured to:

carry, in the interference measurement notification frame, a feedback indication used to indicate the second station to feed back the measurement result; or send a measurement result feedback notification frame to the second station, where the measurement result feedback notification frame is used to notify the second station to feed back the measurement result.

In one embodiment, the interference measurement notification frame includes the following fields:

a first station identifier and/or a first link identifier; a transmit power, used to indicate a transmit power at which the first station sends the measurement signal; and a second station identifier and/or a second link identifier.

In one embodiment, the interference measurement notification frame further includes one or more of the following fields:

a feedback link identifier, used to indicate a link on which the second station feeds back the measurement result;

a feedback time point, used to indicate a time point at which the second station feeds back the measurement result;

a receive power feedback threshold, used to indicate a threshold at which the second station feeds back the receive power; and a feedback type, used to indicate a type of information used by the second station to feed back a cross-link interference strength.

For a concept, explanation, detailed description, and other operations that are related to the access point and the technical solution provided in this embodiment of this application, refer to description about content related to the access point in the foregoing method or another embodiment. Details are not described herein again.

Figure 15:
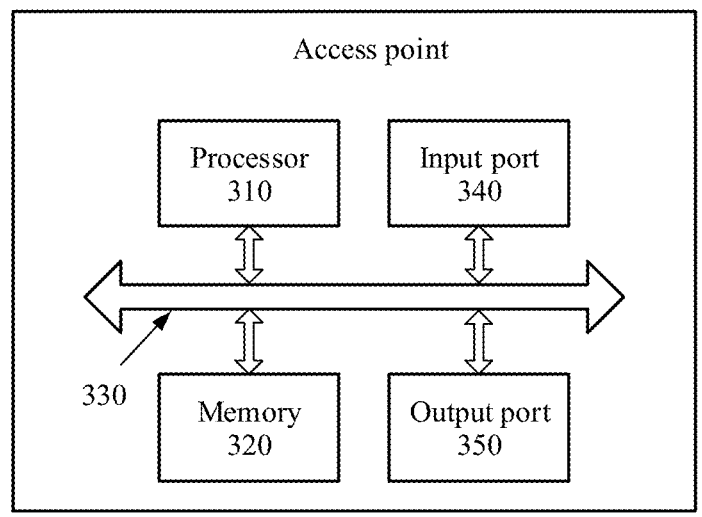
FIG. 15 is a schematic composition diagram of another access point according to an embodiment of this application.

FIG. 15 is a schematic composition diagram of another access point according to an embodiment of this application. The access point may include a processor 310, a memory 320, and a bus 330. The processor 310 and the memory 320 are connected through the bus 330. The memory 320 is configured to store instructions. The processor 310 is configured to execute the instructions stored in the memory 320, to implement operations performed by the access point in the methods corresponding to FIG. 2 and FIG. 8 and FIG. 9.

Further, the access point may further include an input port 340 and an output port 350. The processor 310, the memory 320, the input port 340, and the output port 350 may be connected through the bus 330.

The processor 310 is configured to execute the instructions stored in the memory 320, to control the input port 340 to receive a signal and control the output port 350 to send a signal, to complete the operations performed by the access point in the foregoing method. The input port 340 and the output port 350 may be a same physical entity or different physical entities. When the input port 340 and the output port 350 are a same physical entity, the input port 340 and the output port 350 may be collectively referred to as input and output ports. The memory 320 may be integrated into the processor 310, or may be disposed separately from the processor 310.

In an implementation, functions of the input port 340 and the output port 350 may be implemented by using a transceiver circuit or a dedicated transceiver chip. The processor 310 may be implemented by using a dedicated processing chip, a processing circuit, a processor, or a general-purpose chip.

In another implementation, the access point provided in this embodiment of this application may be implemented in a form of a general-purpose computer. To be specific, program code that implements functions of the processor 310, the input port 340, and the output port 350 is stored in the memory, and a general-purpose processor executes the code in the memory, to implement the functions of the processor 310, the input port 340, and the output port 350.

For a concept, explanation, detailed description, and other operations that are related to the station and the technical solution provided in this embodiment of this application, refer to description about the content related to the access point in the foregoing method or another embodiment. Details are not described herein again.

A person skilled in the art may understand that, for ease of description, FIG. 11, FIG. 13, and FIG. 15 show only one memory and only one processor. An actual controller may include a plurality of processors and a plurality of memories. The memory may also be referred to as a storage medium, a storage device, or the like. This is not limited in the embodiments of this application.

It should be understood that, the processor in this embodiment of this application may be a central processing unit (CPU), or the processor may further be another general-purpose processor, a digital signal processor (DSP), an application-specific integrated circuit (ASIC), a field-programmable gate array (FPGA), or another programmable logical device, a discrete gate or transistor logical device, a discrete hardware component, or the like.

The memory may include a read-only memory and a random access memory, and provide instructions and data for the processor. A part of the memory may further include a non-volatile random access memory.

In addition to a data bus, the bus may further include a power bus, a control bus, a status signal bus, and the like. However, for clear description, various types of buses are marked buses in the figure.

In an implementation process, operations in the foregoing methods can be implemented by using a hardware integrated logical circuit in the processor, or by using instructions in a form of software. The operations of the method disclosed with reference to the embodiments of this application may be directly performed by a hardware processor, or may be performed and completed by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor. To avoid repetition, details are not described herein again.

According to the method provided in the embodiments of this application, an embodiment of this application further provides a system, including the foregoing access point, two types of stations, and the like.

In various embodiments of this application, sequence numbers of the foregoing processes do not mean execution sequences. The execution sequences of the processes should be determined based on functions and internal logic of the processes, and should not be construed as any limitation on the implementation processes of the embodiments of this application.

A person of ordinary skill in the art may be aware that, various illustrative logical blocks (ILB) and operations that are described with reference to the embodiments disclosed in this specification may be implemented by using electronic hardware or a combination of computer software and electronic hardware. Whether the functions are performed by using hardware or software depends on particular applications and design constraints of the technical solutions. A person skilled in the art may use different methods to implement the described functions for each particular application, but it should not be considered that the implementation goes beyond the scope of this application.

In the several embodiments provided in this application, it should be understood that the disclosed systems, apparatuses, and methods may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in an electrical form, a mechanical form, or another form.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communications apparatus, operating as a second station, comprising:
   a transceiver configured to receive, on a second link, a measurement signal sent by a first station on a first link; and
   a processor configured to generate a measurement result based on the measurement signal, wherein
   the transceiver is further configured to:
   send the measurement result to an access point; and
      receive an interference measurement notification frame broadcast by the access point, wherein the interference measurement notification frame carries a feedback indication to indicate the second station to feed back the measurement result; and
      receive a measurement result feedback notification frame, sent by the access point, to notify the second station to feed back the measurement result.

2. The communications apparatus according to claim 1, wherein the measurement result comprises:
   a first station identifier and/or a first link identifier; a second station identifier and/or a second link identifier; or whether there is cross-link interference and/or a cross-link signal attenuation strength.

3. The communications apparatus according to claim 2, wherein the measurement result further comprises one or more of:
   a transmit power to indicate a transmit power at which the first station sends the measurement signal; or
   a receive power to indicate a receive power at which the second station receives the measurement signal.

4. The communications apparatus according to claim 1, wherein the measurement signal includes a data packet sent by the first station on the first link; or
   the measurement signal includes a measurement signal sent by the first station on the first link, after the first station receives the interference measurement notification frame broadcast by the access point.

5. A communications apparatus, operating as a first station comprising:
   a processor configured to instruct a transceiver to send a measurement signal on a first link; and
   the transceiver configured to receive interference information sent by an access point, wherein the interference information is generated by the access point based on a measurement result sent by a second station, wherein the measurement result is generated when the second station receives, on a second link, the measurement signal sent by the first station on the first link, and wherein
   the second station receives an interference measurement notification frame broadcast by the access point, wherein the interference measurement notification frame carries a feedback indication to indicate the second station to feed back the measurement result, and
   the second station receives a measurement result feedback notification frame sent by the access point to notify the second station to feed back the measurement result.

6. The communications apparatus according to claim 5, wherein the interference information comprises:
   a first link identifier; a second link identifier; a second station identifier; or whether there is cross-link interference and/or a cross-link signal attenuation strength.

7. The communications apparatus according to claim 5, wherein the measurement signal includes a data packet sent by the first station on the first link; or
   the measurement signal includes a measurement signal sent by the first station on the first link after the first station receives an interference measurement notification frame broadcast by the access point.

8. A communications apparatus, comprising:
   a transceiver, configured to:
   receive a measurement result sent by a second station, wherein the measurement result is generated when the second station receives, on a second link, a measurement signal sent by a first station on a first link; and
      carry, in an interference measurement notification frame, a feedback indication to indicate the second station to feed back the measurement result; and
      send a measurement result feedback notification frame, to the second station, to notify the second station to feed back the measurement result; and
   a processor, configured to generate interference information based on the measurement result, and instruct the transceiver to send the interference information to the first station.

9. The communications apparatus according to claim 8, wherein the interference information comprises: a first link identifier; a second link identifier; a second station identifier; or whether there is cross-link interference and/or a cross-link signal attenuation strength.

10. The communications apparatus according to claim 8, wherein the measurement result comprises:
    a first station identifier and/or a first link identifier; a second station identifier and/or a second link identifier; or whether there is cross-link interference and/or a cross-link signal attenuation strength.

11. The communications apparatus according to claim 10, wherein the measurement result further comprises one or more of:
    a transmit power, used to indicate a transmit power at which the first station sends the measurement signal; or
    a receive power, used to indicate a receive power at which the second station receives the measurement signal.

12. The communications apparatus according to claim 8, wherein the measurement signal includes a data packet sent by the first station on the first link; or
    the transceiver is further configured to broadcast the interference measurement notification frame to indicate the first station to send the measurement signal on the first link.

13. The communications apparatus according to claim 12, wherein the interference measurement notification frame comprises:
    the first station identifier and/or a first link identifier; the transmit power to indicate the transmit power at which the first station sends the measurement signal; or a second station identifier and/or a second link identifier.

14. The communications apparatus according to claim 13, wherein the interference measurement notification frame further comprises one or more of:
    a feedback link identifier to indicate a link on which the second station feeds back the measurement result;
    a feedback time point to indicate a time point at which the second station feeds back the measurement result;
    a receive power feedback threshold to indicate a threshold at which the second station feeds back the receive power; and a feedback type to indicate a type of information used by the second station to feed back a cross-link interference strength.

\* \* \* \* \*